May 23, 1961 L. E. JULIAN 2,985,781
SLIP RING ASSEMBLY
Filed Sept. 22, 1958

INVENTOR.
Lawrence E. Julian
BY
His Attorney

United States Patent Office 2,985,781
Patented May 23, 1961

2,985,781

SLIP RING ASSEMBLY

Lawrence E. Julian, Markleville, Ind., assignor to General Motors Corporation, Detroit, Mich., a corporation of Delaware Filed Sept. 22, 1958, Ser. No. 762,352

5 Claims. (Cl. 310—232)

This invention relates to slip ring assemblies for dynamoelectric machines.

In past slip ring constructions, it has been common practice to form a slip ring from a block of insulating material that carries a plurality of conducting rings that have a tight frictional fit with the outer surface of the insulating material. In this sort of construction, the lead wires that are connected with the slip rings have been embedded in the insulating material and have been welded, brazed or otherwise connected with the slip rings.

The above described slip ring assembly has certain disadvantages in that it is difficult to make a good connection between the lead wires and the conducting rings. In addition, in many instances it has been necessary to resort to molding operations in order to fabricate the slip rings with the embedded lead wires and attached conductor rings.

It is accordingly an object of this invention to provide a slip ring assembly wherein the lead-in connectors are integral with the conducting rings and wherein insulating material is provided between the conducting rings and lead-in connectors. With this construction, the lead-in connectors need not be welded or otherwise connected with the conducting rings and thus the slip rings are more easy to fabricate than those heretofore known. In addition, the strength of the connection between the conducting ring and lead-in connector is greater as compared with welded connections and the like as the conducting rings and lead-in connectors are integral.

Another object of this invention is to provide a slip ring assembly that may be built up from preformed parts which are assembled to a central hub.

Still another object of this invention is to provide a slip ring assembly wherein a central hub or core supports alternate conducting rings and insulating parts and wherein the parts of the assembly are held between a flanged portion of the core and a punched out portion of the core.

A further object of this invention is to provide a method of fabricating a slip ring assembly which includes slipping the parts of the slip ring on a hub having a flange portion and then hollow punching the hub to tightly compress the parts of the slip ring assembly between the flange portion and the punched out portion of the hub.

Further objects and advantages of the present invention will be apparent from the following description, reference being had to the accompanying drawings wherein a preferred embodiment of the present invention is clearly shown.

Figure 1:
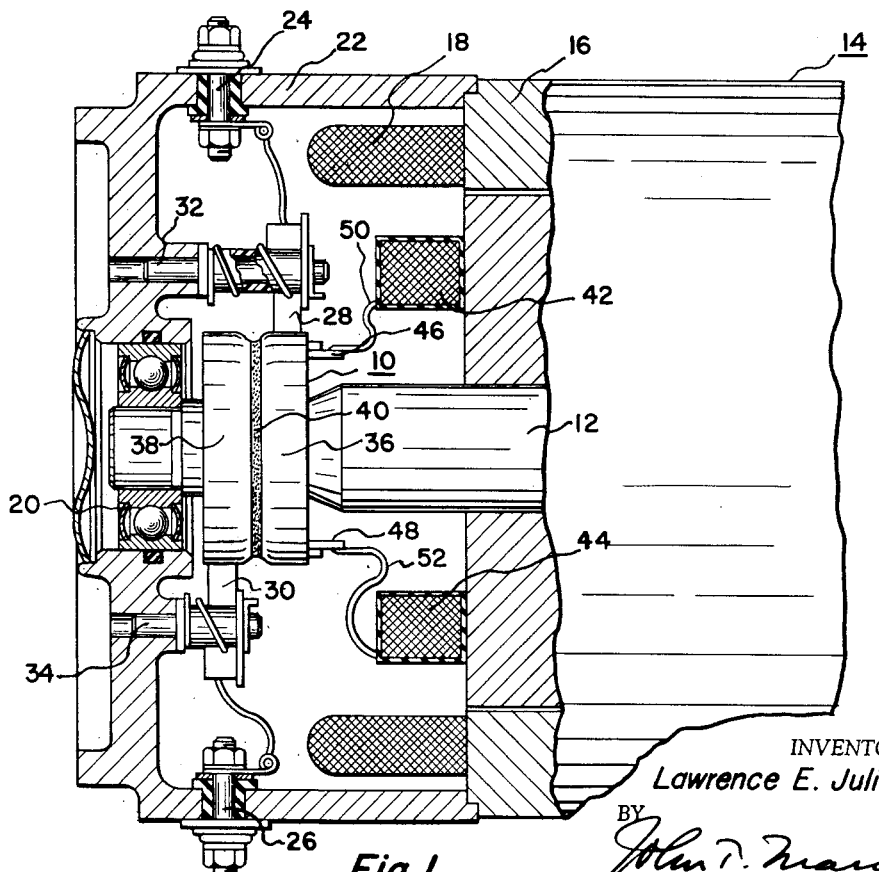
Figure 1 is a sectional view of a dynamoelectric machine that uses the slip ring assembly of this invention.

Referring now to the drawings, and more particularly to Figure 1, the slip ring assembly of this invention, generally designated by reference numeral 10, is shown supported by a shaft 12 of a dynamoelectric machine generally designated by reference numeral 14. The dynamoelectric machine may be of any well-known construction, and in this particular case, includes a main frame 16 which supports a stator or output winding 18. The shaft 12 that supports the slip ring assembly is journalled for rotation in ball bearings 20 and is supported at its opposite end by a second pair of ball bearings (not shown) that may be supported in an end frame that is secured to main frame 16. The ball bearings 20 are supported in an end frame 22 which is secured to main frame 16 by a plurality of through bolts not shown. The end frame 22 supports terminal studs 24 and 26 which are electrically connected with brushes 28 and 30. The brushes 28 and 30 are pivotally supported on studs 32 and 34 and are insulated therefrom. The brush 28 engages the conducting ring 36 of slip ring assembly 10 whereas the brush 30 engages the conducting ring 38 of the slip ring assembly. The conductors 36 and 38 are insulated from each other by insulator member 40 in a manner which may be more fully described hereinafter.

The shaft 12 supports rotor windings 42 and 44 which are electrically connected with connector tabs or lead-in connectors 46 and 48 of the slip ring assembly. The winding 42 is connected with connector tab 46 by a lead wire 50 whereas the connector tab 48 is connected with rotor winding 44 via a lead wire 52. In each case, the lead wires may be welded or otherwise secured to the connector tabs 46 and 48 and these connector tabs are integral with conducting rings 38 and 36, as will become readily apparent hereinafter. The dynamoelectric machine of Figure 1 is an A.C. generator with direct current being supplied to the field windings 42 and 44 through studs 24 and 26 and with the A.C. voltage being taken off the stator or output winding 18. It will be apparent to those skilled in the art, however, that it may be of any type that requires a slip ring for operation.

Figure 3:
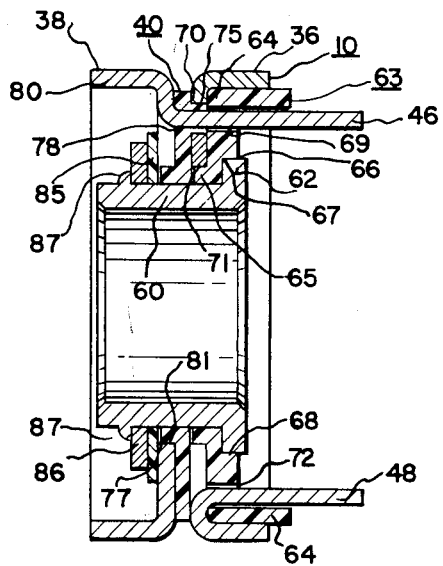
Figure 3 is a sectional view taken along line 3—3 of Figure 2.
Figure 2:
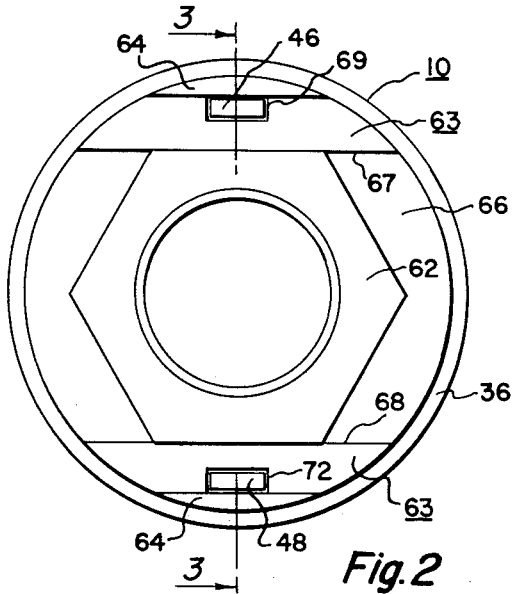
Figure 2 is an end view of the slip ring assembly shown in Figures 1 and 3.

The slip ring assembly, as is better illustrated in Figures 2 and 3, comprises a central hub or core 60 having a flanged portion 62. The outer contour of the flanged portion 62 is formed as a hexagon as is illustrated in Figure 2, and this core member is preferably formed of steel or other similar metal. The core member 60 is press-fitted onto the shaft 12 when the slip ring assembly is attached to the shaft.

The core member 60 supports an insulator member generally designated by reference numeral 63 and including annular portions 64 and an axially extending hub portion 65. The insulator member is formed of any suitable plastic insulating material such as nylon and is recessed as at 66. The recessed portion provides a pair of walls 67 and 68 which engage two sides of the hexagonal-shaped flange portion of hub 60. The insulator member 63 has a rectangular opening 69 as is clearly shown in Figures 2 and 3.

The insulator member 63 carries the conducting ring 36 which may be formed of suitable electrically conducting material such as brass. The conducting ring 36 has an opening 70 and has a central opening 71 which provides a wall that fits over the outer periphery of the hub portion 65 of insulator member 63. The connector tab 48 or lead-in connector for slip ring 36 is formed integral with the slip ring as is best illustrated in Figure 3. This tab 48 is formed as a struck-away portion of the conducting ring 36 and passes through a rectangular opening 72 formed in insulator member 63.

It is seen from the drawings that the annular portion of the conducting ring 36 embraces the annular portions 64 of the insulator member 63.

A second annular insulator member 40 is positioned adjacent the conducting ring 36 and has a projection 75 fitting within opening 70 formed in conducting ring 36.

The insulator member 40 has a hub portion 77 which embraces the core member 60. The insulator member 40 has an opening 78 and is formed of suitable plastic material such as nylon.

The conducting ring 38 has an annular wall 80 and a central opening 81 which engages the outer periphery of hub portion 77. The connector tab 46 is integral with the conducting ring 38 as is clearly apparent from Figure 3, the connector tab being formed as a struck-away portion of slip ring 38. The connector tab 46 as is clearly apparent from Figure 3 passes through openings 78 and 69 formed respectively in insulator members 40 and 63. It will be appreciated that the projecting portion 75 of insulating member 40 insulates the lead-in connector 46 from the conducting ring 36.

An insulating washer 85 formed of suitable insulating material such as nylon is positioned over the hub 60. This insulating washer is backed up by a steel washer 86 that slips over the hub or core member 60 and which tightly engages the insulating washer 85. The parts of the slip ring assembly are held together by hollow punching the core 60 as at 87 so that the parts are thus held together and between the punched-out part 87 and the flange 62 of the core.

The method of fabricating the slip ring assembly of this invention is first to provide a hub member 60 having a flanged portion 62. The hub member is then fitted with the insulator member 63. When the insulator member is set in place, the conducting ring 36 is placed over the annular insulating member 63 with the connector tab 48 being passed through the opening 72 in the insulator member. The insulator member 40 is then slipped over the core 60 with the projection 75 fitting within the slot 70 formed in the conducting ring 36. After the insulator member 40 is in place, the conducting ring 38 is slipped over the outer hub 77 of insulator member 40 with the lead-in connector 46 passing through insulator member 40, conducting ring 36 and insulator member 63. With these parts in place, the insulating washer 85 and the steel washer 86 are placed over the core 60. When all of the parts have been assembled as heretofore described, the core 60 is hollow punched to provide punched-out portion 87 that tightly compresses the parts of the slip ring assembly against the flanged portion 62 of the core. The various insulator and slip ring parts of the assembly are thus held in fixed relationship with each other and with the core 60 by compressing them between punched-out part 87 and flange 62.

It is apparent from the foregoing that the slip ring assembly is fabricated from preformed parts and that no molding operation is required during the assembly of the parts. In addition, no welding, soldering, or other similar operation is necessary to connect the connector tabs 46 and 48 with the respective conductor rings as they are integrally formed with the conductor rings. When the slip ring assembly is finally assembled as has been heretofore described, it is secured to the shaft of a dynamoelectric machine by slipping the hub portion 60 over a shaft with a press fit or by any other sort of mechanical connection.

While the embodiment of the present invention as herein disclosed constitutes a preferred form, it is to be understood that other forms might be adopted.

What is claimed is as follows:

1. A slip assembly comprising, a core member having an integral flange, a first insulator member supported by said core member and abutting said flange, a first conductor ring supported by said first insulator member, a second insulator member supported by said core member and located adjacent said first insulating member and said first conductor ring, a second conductor ring supported by said second insulator member, a first connector tab formed integrally with said first conductor ring and extending through an opening formed in said first insulating member, a second connector tab formed integrally with said second conductor ring and passing through said first and second insulators and through said first conductor ring, a third insulating member embracing said core and engaging said second conductor ring, a metal washer embracing said core member and engaging said third insulating member, and a punched-out projecting portion extending from said core member and engaging said metal washer for holding the parts of said slip ring assembly in tight engagement with each other and with the flanged portion of said hub.

2. A slip ring assembly comprising, a core member, a first insulator member supported by said core member, a first conductor ring having an opening supported by said first insulator member, said first insulator member having a first and second opening, a second insulator member supported by said core member and having an axially projecting portion fitting within said first conductor ring opening, a second conductor ring supported by said second insulator member and having an integral axially extending connector tab extending through said first and second insulator members and through said first conducting ring, and a second connector tab formed integrally with said first conductor ring and extending through said second opening in said first insulator member.

3. A slip ring assembly comprising, a metal core member, a first insulator member supported from said metal core member having first and second openings, a first conductor ring supported by said first insulator member, a second insulator member supported by said core member and having an axially projecting portion fitting within an opening formed in said first conductor ring, a third opening in said second insulator member located through the projecting portion of said second insulating member, a second conductor ring supported by said second insulator member, a first connector tab formed integrally with said first conductor ring and extending through said second opening formed in said first insulator member, and a second connector tab formed integrally with said second conductor ring and passing through said third opening in said second insulator member and through said first opening formed in said first insulator member.

4. A slip ring assembly comprising, a core member, a first insulator member supported by said core member having an outer annular portion and a web portion extending substantially normal to said annular portion and terminating in an annular wall that engages said core member, a first slip ring member formed of metal material having an annular portion engaging the annular portion of said first insulator member and having a radially extending wall portion engaging the web portion of said first insulator member, said first slip ring member having an integral conductor tab portion extending through said first insulator member, a second insulator member supported by said core having a radially extending wall portion and a circumferentially extending hub portion, a second slip ring member formed of metal material having an annular portion and a radially extending wall portion terminating in an edge that engages the hub portion of said second insulator member, the radially extending wall portion of said second insulator member being positioned between the radially extending wall portions of said first and second conductor ring members whereby said second insulator member insulates said slip ring members from each other and insulates said second slip ring member from said core member, and a connector tab formed integrally with said second slip ring member extending through said second insulator member, said first slip ring member and said first insulator member.

5. A slip ring assembly comprising, a metal core member having a circumferentially extending flange, a pair of slip ring members formed of electrically conductive material each having an annular portion and a radially extending portion, a pair of insulator members having wall portions contacting said core member and a respective slip ring member for supporting said slip ring members from said core member, one of said insulator members having a portion positioned between one of said slip ring members and said flange and the other insulator member having a portion positioned between the radially extending portions of said slip ring members, a first connector tab integral with one of said slip ring members and extending through one of said insulator members, and a second connector tab formed integrally with the other slip ring member and extending through both insulator members and said one slip ring member.

References Cited in the file of this patent

UNITED STATES PATENTS

| | | |
|---|---|---|
| 1,493,859 | Himes | May 13, 1924 |
| 2,291,071 | Bruno | July 28, 1942 |
| 2,551,030 | Madden | May 1, 1951 |
| 2,880,402 | Gardner | Mar. 31, 1959 |

FOREIGN PATENTS

| | | |
|---|---|---|
| 401,241 | France | July 12, 1909 |
| 876,596 | France | Aug. 10, 1942 |
| 903,944 | Germany | Feb. 11, 1954 |
| 917,496 | Germany | Sept. 6, 1954 |